Sept. 25, 1928.  
A. B. SAURMAN  
1,685,437
CONNECTER FOR SECTOR SHAPED CONDUCTORS
Filed March 24, 1926
FIG.I.
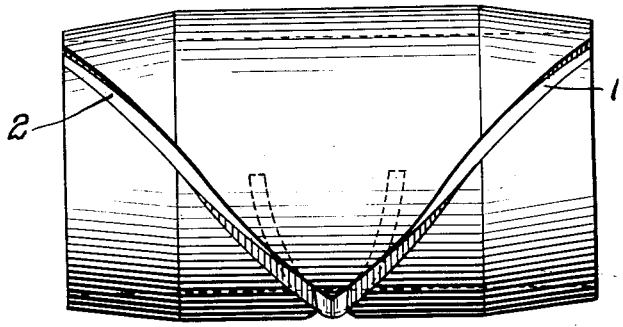
FIG.IV.
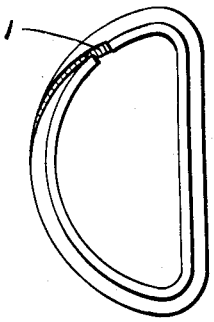
FIG.II.
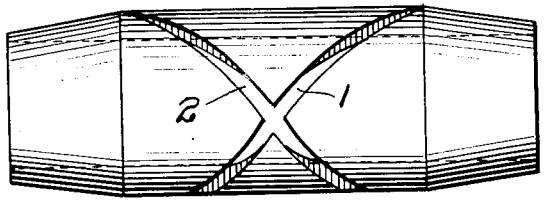
FIG.III.
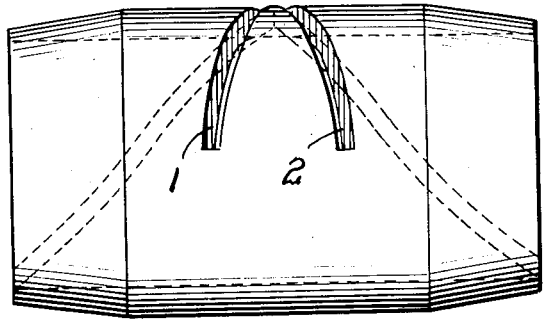
FIG.V.
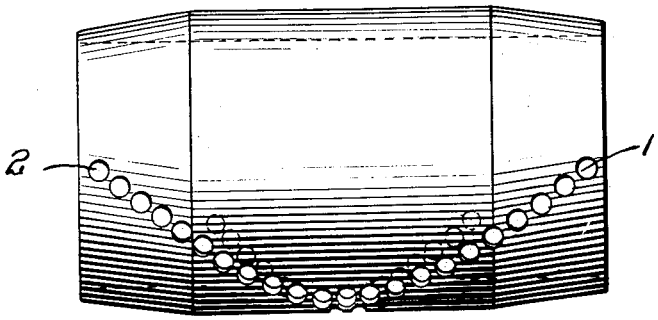
WITNESSES  
J. Herbert Bradley.  
Perry a English
INVENTOR  
Atlee B. Saurman  
by Christy and Christy  
his attorneys Patented Sept. 25, 1928.

1,685,437

UNITED STATES PATENT OFFICE.

ATLEE B. SAURMAN, OF PITTSBURGH, PENNSYLVANIA, ASSIGNOR, BY MESNE ASSIGNMENTS, TO GENERAL CABLE CORPORATION, A CORPORATION OF NEW JERSEY.

CONNECTER FOR SECTOR-SHAPED CONDUCTORS.

Application filed March 24, 1926. Serial No. 97,000.

My invention relates to connecters for sector-shaped conductors. In the installation of electric cables it is necessary at intervals to make union of successive lengths of cable, end to end. The cable conductors are laid bare by the stripping away of sheath and insulation, and the bared conductor ends are electrically united. After the union has been made it is enveloped in insulation and encased in suitable manner. Electrical union of the bared conductor ends is ordinarily effected by introducing them at opposite ends into a sleeve of metal and then running in molten solder to fill all the space within the sleeve and upon and around the introduced conductor ends. The sleeve is ordinarily provided with an opening, for the running in of molten solder, after the sleeve has been brought to position with the conductor ends in place within it. So long as the cable conductors are round the application of the sleeve and the running-in of molten solder are simple matters; but when dealing with multiple-conductor cables whose component conductors are sector-shaped in cross-section, a difficulty presents itself. The component conductors are necessarily arranged with the geometric center to which the sector is formed coincident with the axis of the cable, or approximately so, and the conductors in their longitudinal extent are necessarily twisted helically about the cable axis. It follows from this that at successive points in the length of the sector-shaped conductor within the cable the sector will be differently positioned with respect to the vertical. The connecting sleeve employed in making the electrical union must in its cross-sectional shape correspond to the conductors to which it is applied. So long as the conductor is circular there is no difficulty; an opening formed in the side for the teeming-in of molten solder and which manifestly must for purposes of teeming-in of molten solder be on the upper side of the sleeve when in place, may in any case be brought to position merely by rotation of the sleeve when applied. But in the case of sector-shaped conductors the sleeve when applied may not be rotated; the shape of the conductor forbids. An opening such as is usual in the sleeve for round conductors if formed in a sleeve for sector-shaped conductors will be serviceable when the cut in the helically twisted sector-shaped conductors happens to come at a point where the sector is properly disposed to the vertical; but if the cut happens to come at another point, such an opening will not serve. And the chances are that the cut will not come at the right point. By my invention this difficulty is avoided.

In the accompanying drawings Fig. I is a view in plan from above, Fig. II a view in side elevation, Fig. III a view in plan from beneath, and Fig. IV a view in end elevation of a connecting sleeve for a sector-shaped conductor, having my invention embodied in it. Fig. V is a view corresponding to Fig. I of another connecter in which with a minor variation my invention is present. In these figures the connecter shown is adapted for use upon a sector-shaped conductor of 180° C. angular value; the applicability of the invention to a connecter for use upon a sector-shaped conductor of any angular value will be apparent without more particular illustration.

The connecting sleeve, as best shown in Fig. IV, corresponds in cross-sectional shape to the conductor ends to which it is to be applied and whose union it is to effect. As most clearly shown in Figs. I, II, and III it is preferably formed somewhat larger in its medial part than the conductors and is toward its ends tapered approximately to the size of the conductors to which it is to be applied.

The sleeve is provided with two slots, 1 and 2, which, symmetrically arranged with respect to a transverse mid-plane through the sleeve extend obliquely from opposite ends of the sleeve toward the middle and preferably cross on the transverse mid-plane. These two slots extend circumferentially of the sleeve approximately half way around; in the particular form shown in Figs. I–IV the circumferential extent of the slots is more than half way around; in the form shown in Fig. V the extent is something less than half way around. The blank and unslotted portion of the sleeve includes in each instance, as will be perceived on comparing Figs. I, IV, and V, one of the angles of the sector. The slots penetrate the sleeve wall. The sleeve wall will be of metal, and the slots may readily be formed as kerfs cut by a saw in sleeves initially formed with continuous and unbroken walls. Fig. V shows that, by way of alternative, a succession of discontinuous holes may take the place of the slot of the other figures. In the ensuing claim I use the phrase "obliquely extending opening" to include both the continuous slot of Figs. I-IV, and the succession of discontinuous holes of Fig. V.

These features are to be remarked: First, by the provision of slots which extend approximately half way around, it matters not what the particular position of the sector-shaped conductor ends may be with respect to the vertical at the point where union is to be effected; the sleeve may be applied with the slots at some point in their extent properly placed for the pouring-in of molten solder. Second, the obliquity of the slots in their extent gives the desired prolongation with minimum weakening of the rigidity of the sleeve as a whole. By causing the slots to cross one another and extend beyond the transverse mid-plane of the sleeve their obliquity may be increased and the greatest rigidity of the sleeve as a whole consistent with the achievement of the end in view, may be attained. Third, the provision of two slots symmetrically disposed with respect to the transverse mid-plane brings it about that, whatever be the particular position of the sleeve when applied, the opening or openings (in every position but one there will be two exposed openings) as presented for the running-in of solder will be symmetrical longitudinally of the sleeve, and the spaces within the sleeve will toward the two ends be equally accessible to the entrance of the molten metal. Fourth, the maintenance of one of the angles of the sector unslotted, makes for rigidity of the sleeve as a whole.

Application is manifest. The sleeve is applied to the prepared conductor ends kerfed side uppermost—as always is possible, since the sleeve is symmetrical end to end. When so applied the kerfs afford openings at the highest point through which molten solder may be teemed-in. The stoppage of the kerfs elsewhere to prevent the running away of the poured-in solder is a matter of every-day familiarity to the workman. In every other respect the procedure is that commonly practiced in connecting round conductors.

I claim as my invention:

A relatively infusible sleeve adapted to be soldered to place, and to effect electrical union of two sector-shaped conductors, the sleeve being sector-shaped in cross-section and being ported by a transversely extending opening, such opening extending through one angle of the said sleeve, the web of material of which the sleeve consists being through another angle continuous, unbroken by such elongate opening.

In testimony whereof I have hereunto set my hand.

ATLEE B. SAURMAN.